United States Patent
Ryu et al.

(10) Patent No.: US 10,292,161 B2
(45) Date of Patent: May 14, 2019

(54) METHOD AND APPARATUS FOR PERFORMING UPLINK TRANSMISSION IN WIRELESS LAN SYSTEM

(71) Applicant: LG ELECTRONICS INC., Seoul (KR)

(72) Inventors: Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/515,522

(22) PCT Filed: Jun. 13, 2016

(86) PCT No.: PCT/KR2016/006234
§ 371 (c)(1),
(2) Date: Mar. 29, 2017

(87) PCT Pub. No.: WO2016/204460
PCT Pub. Date: Dec. 22, 2016

(65) Prior Publication Data
US 2017/0230981 A1 Aug. 10, 2017

Related U.S. Application Data

(60) Provisional application No. 62/197,085, filed on Jul. 26, 2015, provisional application No. 62/181,207, filed on Jun. 18, 2015.

(51) Int. Cl.
*H04W 72/04* (2009.01)
*H04W 52/54* (2009.01)
(Continued)

(52) U.S. Cl.
CPC ....... *H04W 72/0453* (2013.01); *H04W 52/54* (2013.01); *H04W 72/042* (2013.01);
(Continued)

(58) Field of Classification Search
CPC ............. H04W 74/00; H04W 72/0453; H04W 72/042; H04W 72/0413; H04W 72/0406;
(Continued)

(56) References Cited

U.S. PATENT DOCUMENTS

| 2008/0137627 A1 | 6/2008 | Fischer et al. |
| 2014/0098724 A1 | 4/2014 | Park et al. |

(Continued)

FOREIGN PATENT DOCUMENTS

| WO | 02093831 | 11/2002 | |
| WO | WO-02093831 A2 * | 11/2002 | ............ H04W 16/14 |

(Continued)

OTHER PUBLICATIONS

S. Sou and Y. Lee, "Trigger-based approach with hidden node problem for uplink multi-user transmission in 802.11ax," 2017 IEEE 18th International Workshop on Signal Processing Advances in Wireless Communications (SPAWC), Sapporo, 2017, pp. 1-5. doi: 10.1109/SPAWC.2017.8227708 https://ieeexplore.ieee.org/stamp/st.*

(Continued)

*Primary Examiner* — Maharishi V Khirodhar
*Assistant Examiner* — Kenneth P Hunt
(74) *Attorney, Agent, or Firm* — Lee, Hong, Degerman, Kang & Waimey PC

(57) ABSTRACT

Proposed is a method for determining transmission using a network allocation vector (NAV) in a wireless LAN system. Specifically, after a receiving device receives a trigger frame, which triggers an uplink multiple user transmission, from a transmitting device, whether to transmit an uplink (Continued)

physical layer protocol data unit (PPDU) corresponding to the trigger frame is determined using the NAV of the receiving device. In this case, if the NAV is established by an intra-basic service set (BSS) frame, whether to transmit the uplink PPDU is determined without taking the NAV into consideration.

8 Claims, 15 Drawing Sheets

(51) Int. Cl.
*H04W 74/08* (2009.01)
*H04W 74/00* (2009.01)
*H04W 52/14* (2009.01)
*H04W 84/12* (2009.01)

(52) U.S. Cl.
CPC ... *H04W 72/0406* (2013.01); *H04W 72/0413* (2013.01); *H04W 74/00* (2013.01); *H04W 74/08* (2013.01); *H04W 74/0891* (2013.01); *H04W 52/14* (2013.01); *H04W 52/146* (2013.01); *H04W 72/04* (2013.01); *H04W 84/12* (2013.01)

(58) Field of Classification Search
CPC . H04W 52/54; H04W 74/0891; H04W 84/12; H04W 52/146; H04W 52/14; H04W 72/04; H04W 74/08–74/0825; H04W 74/006
USPC .......................................................... 370/455
See application file for complete search history.

(56) References Cited

U.S. PATENT DOCUMENTS

| | | | | |
|---|---|---|---|---|
| 2017/0006635 | A1* | 1/2017 | Huang | H04W 74/0816 |
| 2017/0064739 | A1* | 3/2017 | Hedayat | H04W 74/0816 |
| 2017/0230981 | A1 | 8/2017 | Ryu et al. | |
| 2017/0367118 | A1* | 12/2017 | Choi | H04W 84/12 |
| 2018/0014327 | A1* | 1/2018 | Park | H04W 74/0808 |
| 2018/0054818 | A1* | 2/2018 | Kakani | H04L 5/0053 |
| 2018/0084584 | A1* | 3/2018 | Umehara | H04W 72/121 |

FOREIGN PATENT DOCUMENTS

| | | |
|---|---|---|
| WO | 2013055117 | 4/2013 |
| WO | 2013073920 | 5/2013 |
| WO | 2015050311 | 4/2015 |
| WO | 2015076917 | 5/2015 |

OTHER PUBLICATIONS

E. Khorov, A Kiryanov, S Schlestraete, H Wang, "Multiple NAVs for Spatial Reuse," Nov. 9, 2015, https://mentor.ieee.org/802 . . . /11-15-1348-00-00ax-multiple-navs-for-spatial-reuse.ppt.*
J Ahn W Ahn R Y Kim "NAV cancellation issues on MU protection," Jan. 19, 2016, https://mentor.ieee.org/ . . . /11-16-0087-01-00ax-nav-cancellation-issues-on-mu-protection.ppt.*
European Patent Office Application Serial No. 16811873.5, Search Report dated Dec. 4, 2018, 8 pages.
Sohn, et al., "Wireless LANs—D1.0 Comment Resolution—Misc. CIDs 2303, 2390, 2862, 3404, 3409", IEEE 802.11-11/1451r1, Nov. 2011, 6 pages.
U.S. Appl. No. 16/218,119, Office Action dated Mar. 8, 2019, 23 pages.

* cited by examiner

FIG. 1
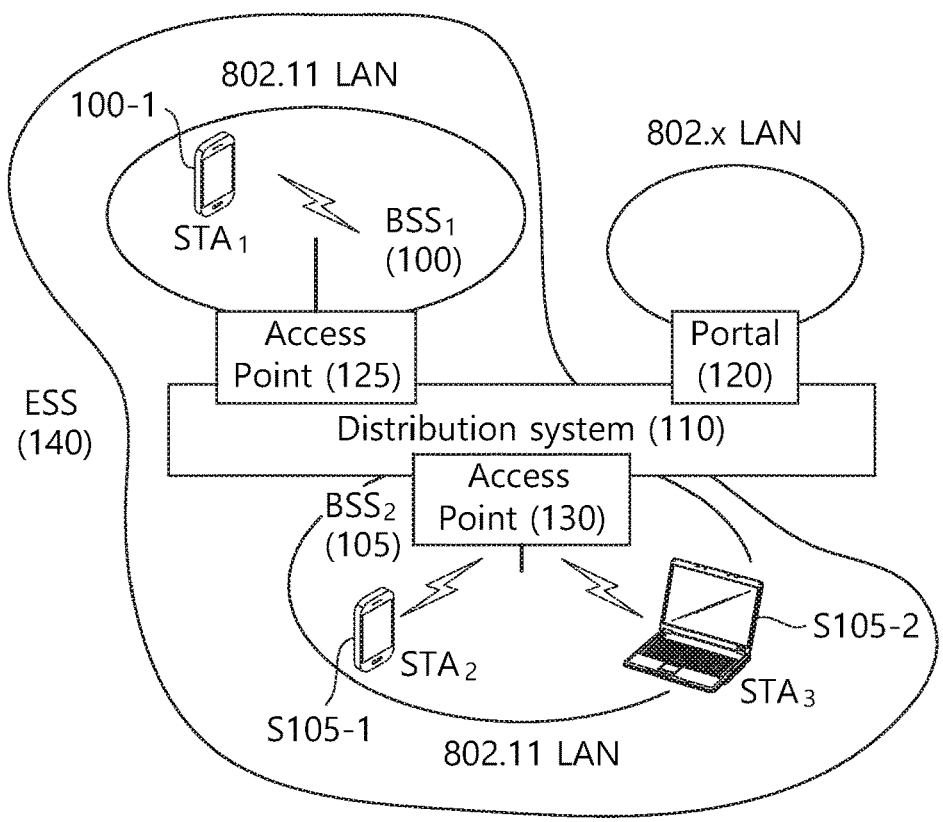
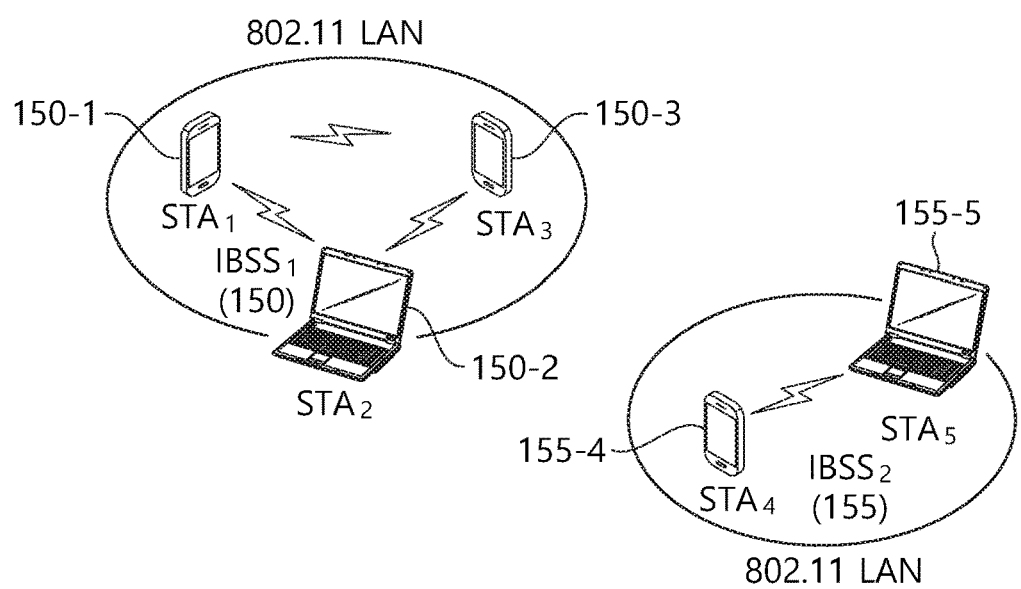

METHOD AND APPARATUS FOR PERFORMING UPLINK TRANSMISSION IN WIRELESS LAN SYSTEM

CROSS-REFERENCE TO RELATED APPLICATIONS

This application is the National Stage filing under 35 U.S.C. 371 of International Application No. PCT/KR2016/006234, filed on Jun. 13, 2016, which claims the benefit of U.S. Provisional Applications Nos. 62/181,207, filed on Jun. 18, 2015 and 62/197,085, filed on Jul. 26, 2015, the contents of which are all hereby incorporated by reference herein in their entirety.

BACKGROUND OF THE INVENTION

Field of the Invention

This specification relates to a method for performing uplink transmission in a wireless LAN system and, most particularly, to an enhanced method related to carrier sensing in case of performing uplink multi-user transmission in a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

This specification proposes an enhanced method in a case when multiple users perform uplink transmission.

This specification proposes an example for resolving the technical problems that may occur in a case when a method for determining whether or not to perform uplink transmission according to the related art is applied to a situation of supporting multiple users.

Technical Solutions

This specification proposes a transmitting method that can be applied to a wireless LAN system.

More specifically, the corresponding method includes a step of receiving a trigger frame triggering uplink multiple user transmission from a transmitting device to a receiving device.

Additionally, the corresponding method also include a step of determining whether or not to transmit an uplink physical layer protocol data unit (PPDU) in response to the trigger frame by using a network allocation vector (NAV) of the receiving device by the receiving device, wherein, in case the NAV is configured by an intra basic service set (BSS) frame, whether or not to transmit the uplink PPDU is determined without considering the NAV.

And, the corresponding method includes a step of transmitting the uplink PPDU from the receiving device to the transmitting device, in case the uplink PPDU is determined to be transmitted.

The above-described method may be applied to an AP device and/or a non-AP device of a wireless LAN system.

Effects of the Invention

According to the example of this specification, in case multiple users perform uplink transmission, enhanced operations may be realized. More specifically, the technical problems that may occur in a case when a method for determined whether or not to perform uplink transmission according to the related art is applied to a situation of supporting multiple users may be resolved by the example of this specification.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
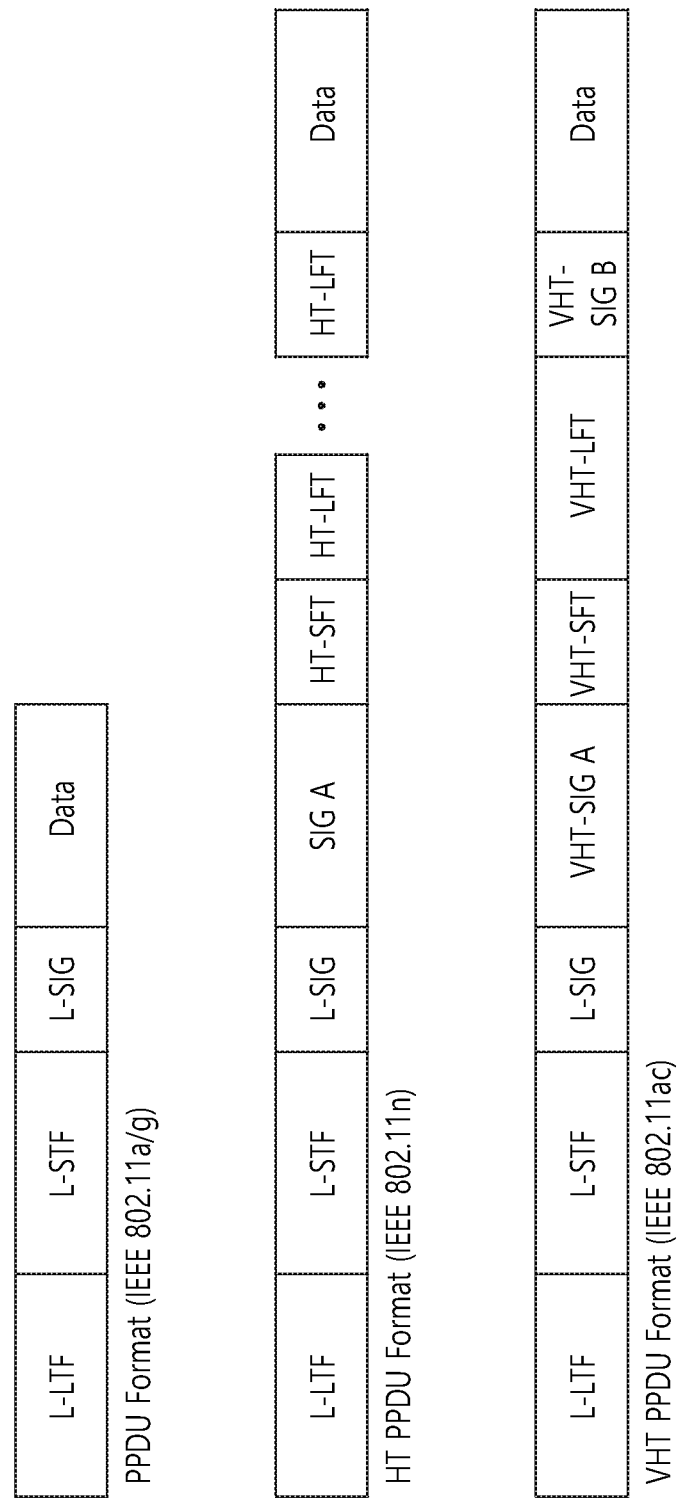
FIG. 2 is a diagram illustrating an example of a PPDU used in an IEEE standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
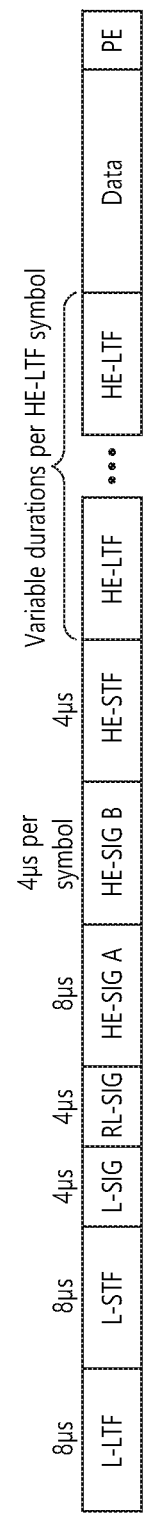
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
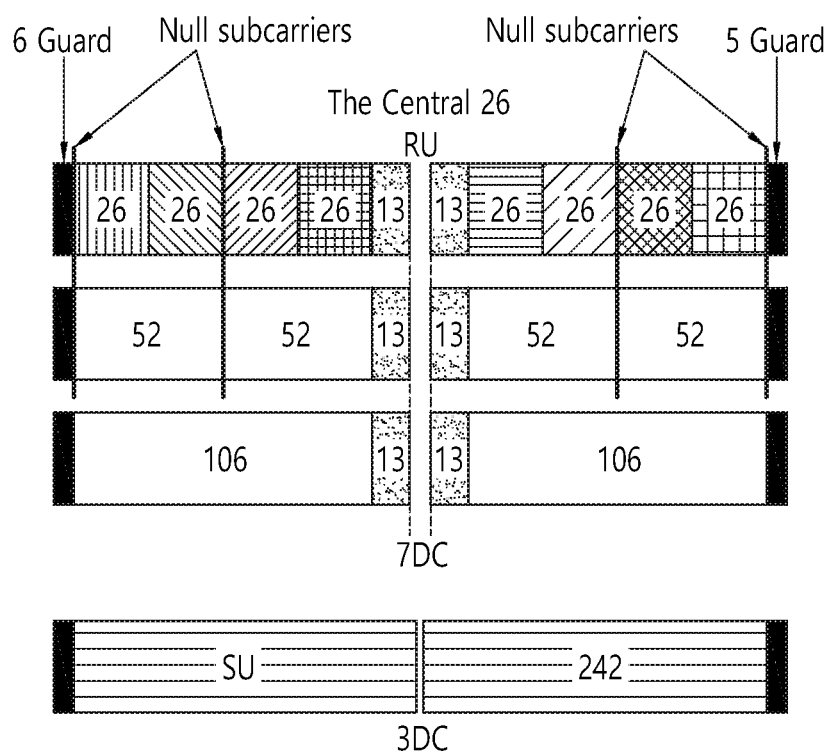
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for each of the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
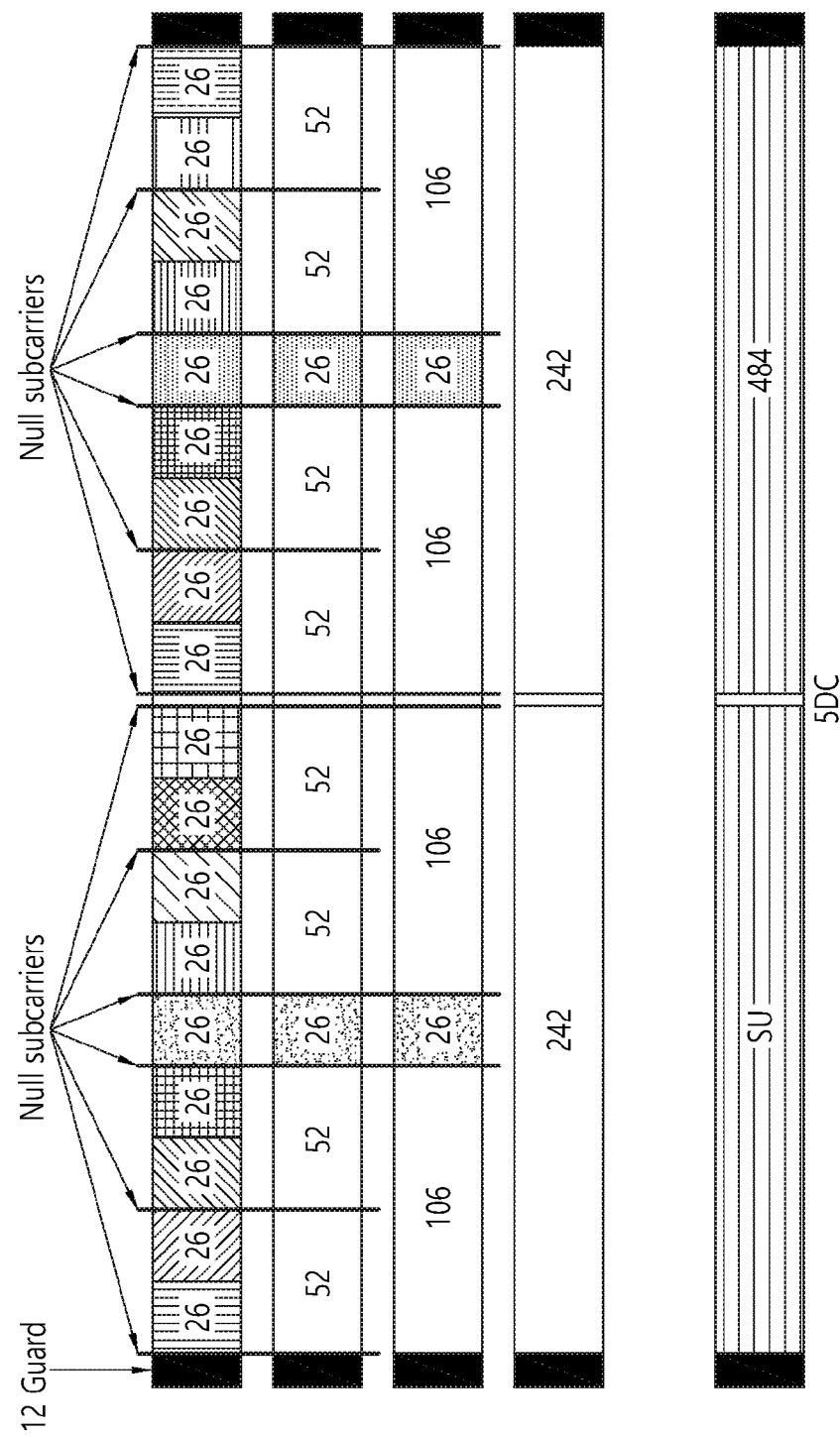
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
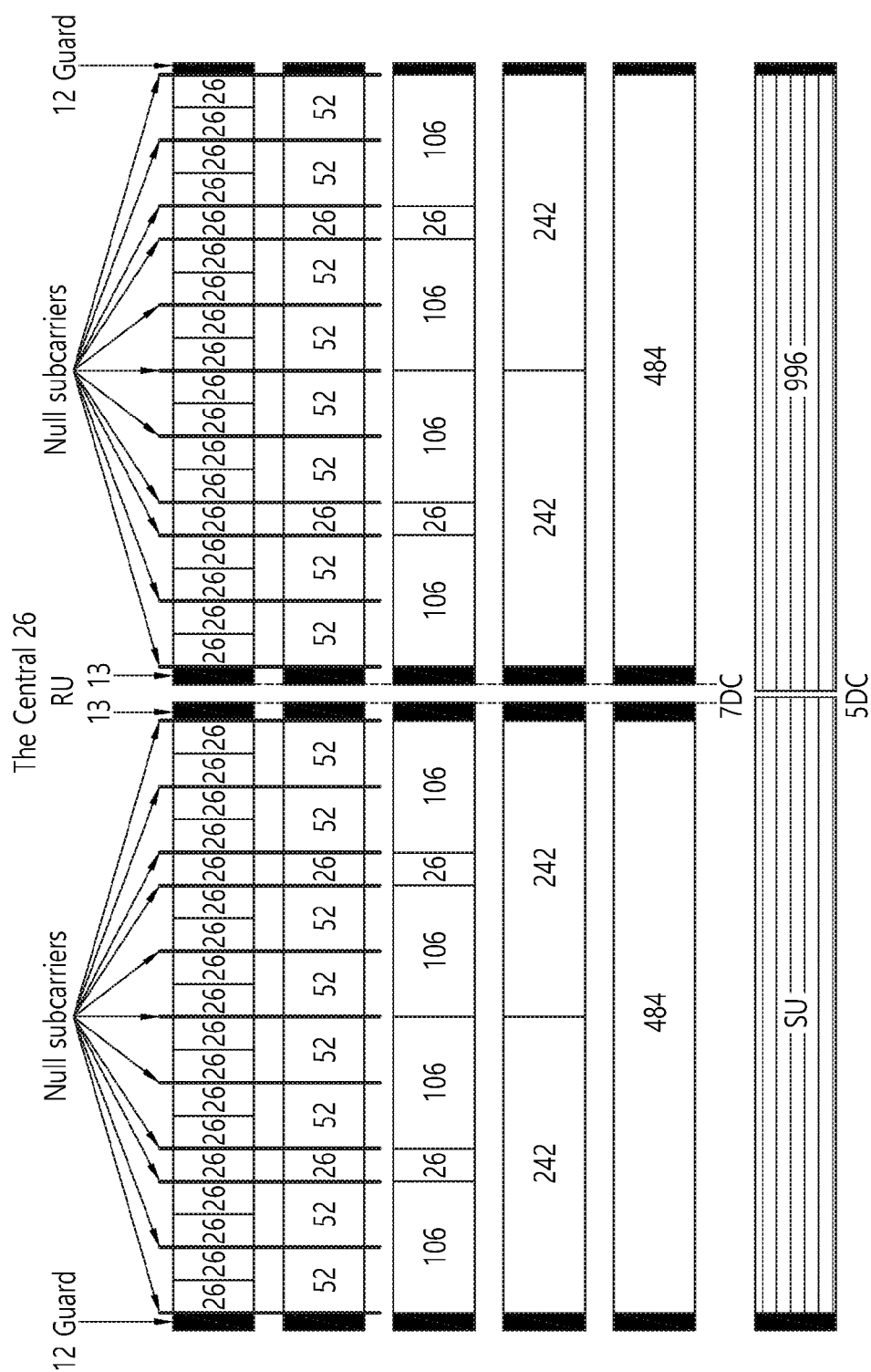
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
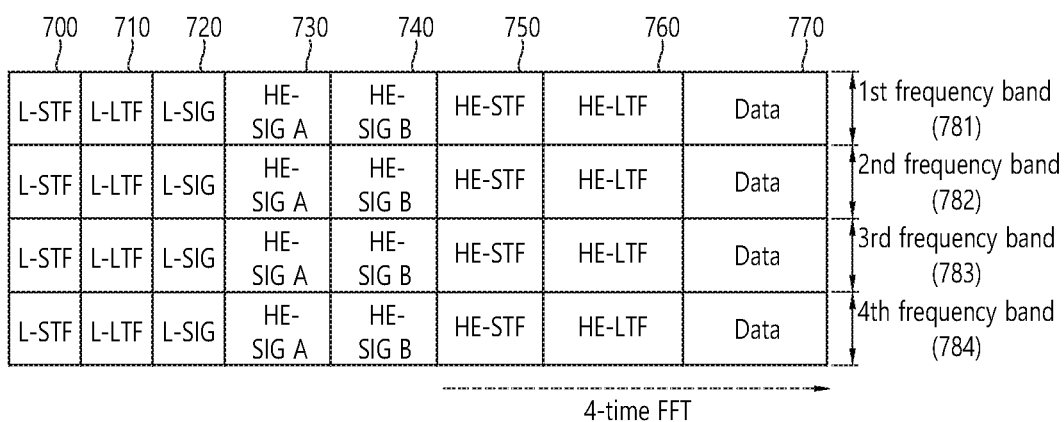
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
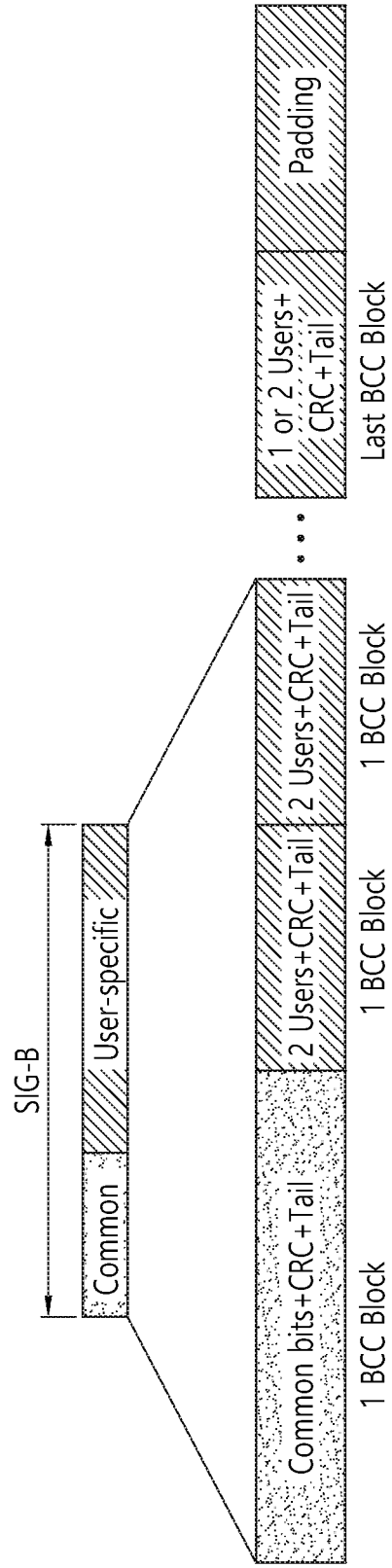
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
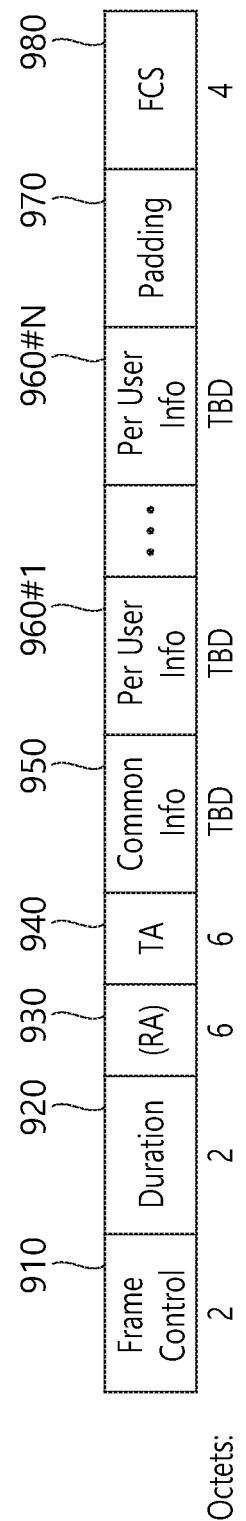
FIG. 9 is a block diagram illustrating an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

Additionally, a RA field 930 may include address information of a receiving STA of the corresponding trigger frame, and this field may also be omitted as required. A TA field 940 may include address information of the STA (e.g., AP) transmitting the corresponding trigger frame, and a common information field 950 may include common control information that is applied to the receiving STA receiving the corresponding trigger frame.

Figure 10:
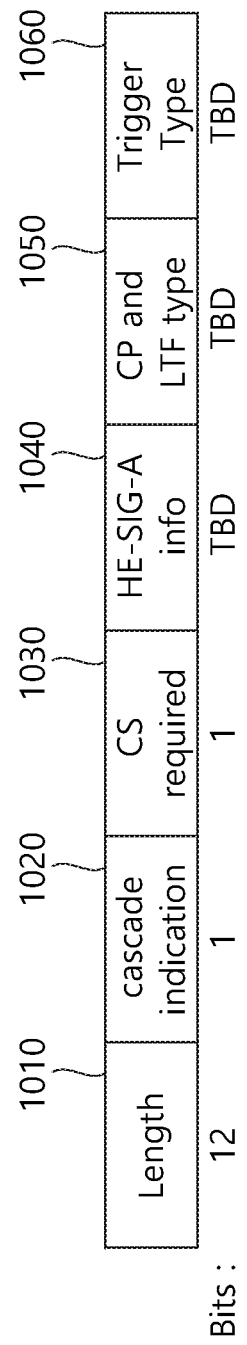
FIG. 10 illustrates an example of a common information field.

FIG. 10 illustrates an example of a common information field. Among the sub-fields of FIG. 10, some may be omitted, and other additional sub-fields may also be added. Additionally, the length of each of the sub-fields shown in the drawing may be varied.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE- SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Meanwhile, the remaining description on FIG. 9 will be additionally provided as described below.

It is preferable that the trigger frame includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 11:
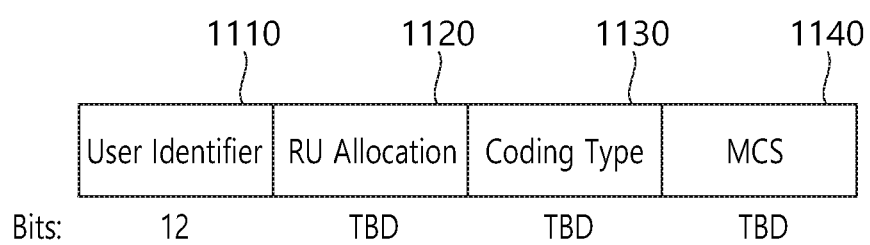
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of the AID.

Additionally, a RU Allocation field 1120 may be included in the sub-field of the per user information field. More specifically, in case a receiving STA, which is identified by the User Identifier field 1110, transmits an uplink PPDU in response to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Hereinafter, the exemplary embodiment relates to a method for controlling transmission of an uplink PPDU corresponding to a network allocation vector (NAV). The detailed description on the NAV is as presented below.

Carrier sensing mechanism for determining whether or not a wireless medium is accessible may be broadly divided into physical carrier sensing and virtual carrier sensing. The physical carrier sensing refers to a method of detecting whether or not a wireless medium is physically available for usage in relation to a shared radio channel by using the related art clear channel assessment (CCA) method, and so on. Since the physical carrier sensing causes power consumption, in order to prevent such power consumption, the virtual channel sensing method may also be used in combination.

The wireless LAN system according to IEEE 802.11 performs virtual carrier sensing by using a method of configuring the NAV through a duration field, which is included in a header of a MAC layer frame. More specifically, the receiving station that has verified the duration field of the received MAC frame configures the NAV based on the received duration field, and, in case the NAV is not equal to 0, the receiving station determines that the wireless medium is a busy state and, therefore, does not perform transmission to the wireless medium. In case the NAV becomes equal to 0 due to a parameter that is counted down, the wireless medium may be considered to be in an idle state and treated accordingly.

A more detailed operation related to the NAV is introduced in the IEEE 802.11 specification, and, more specifically, in case the MAC address that is included in the RA field of the frame, which is received by the receiving station, is identical to the MAC address of the corresponding receiving station, the NAV is not updated. In other words, the NAV is maintained without modification. However, in case the MAC addresses are not identical to one another, the NAV of the corresponding receiving station is compared with the duration field of the received MAC header, and, in case the received duration field is longer, then, the NAV is updated by using the received duration value.

The above-described related art NAV operation had no problem in wireless LAN system supporting a single transmitting device and a single receiving device. However, in an IEEE 802.11ax system to which this exemplary embodiment may be applied or in other enhanced wireless LAN systems the following technical problems may occur. More specifically, in the related art wireless LAN system, since the transmitting device and the receiving device were identically maintained within the same TXOP, there was no unclearness in the NAV operation. However, since multi-user transmission is required to be supported in the TXOP, the following enhanced method is required.

Firstly, the transmission opportunity (TXOP) that is related to multi-user (MU) transmission, i.e., MU TXOP, is determined as described below, which is also related to the problems occurring in the related art method. The TXOP indicates a time duration during which a specific STA has the right to disclose frame exchange sequences to a wireless medium, and this corresponds to a time duration that is generally defined by a starting time and a maximum duration. As described above, in case a problem occurs in a cascade operation, downlink MU transmission and uplink MU transmission may both be performing within the same TXOP. Additionally, the above-described trigger frame may be provided through the MAC layer, and an additional PPDU may be provided during the downlink MU transmission and uplink MU transmission processes. Although only one device may be determined as the transmitting device performing the downlink transmission, multiple UL transmitting devices transmitting each of the uplink MU PPDUs may also be determined as a different set. Additionally, even though both the downlink MU transmission and the uplink MU transmission are performed within the same TXOP, a STA set corresponding to the target of the downlink MU transmission may be different from a STA set corresponding to the subject (or transmitter) of the uplink MU transmission.

In case operations are carried out in accordance with the related art TXOP definitions, multiple trigger frames may be transmitted from a specific transmitting STA (e.g., AP)

during one TXOP (i.e., MU TXOP). More specifically, a first trigger frame may trigger uplink MU transmission (i.e., transmission of the uplink MU PPDUs) from STAs 1-3, and a second trigger frame may trigger uplink MU transmission (i.e., transmission of the uplink MU PPDUs) from STAs 4-6. In this case, if the related art NAV operations are performed, among the STAs that have received the first trigger frame, the remaining STAs excluding STAs 1-3 configure the NAV based on the first trigger frame.

In the above-described situation, even in a case when the transmitting STA (e.g., AP) allocates uplink resources for STAs 4-6 through the second trigger frame (i.e., a case when the RU is allocated by using the 960#1 to 960#N fields of FIG. 9), the corresponding STAs 4-6 may not be capable of adequately transmitting uplink PPDUs in response to the second trigger frame. More specifically, as described above, since the NAV has been configured based on the first trigger frame, even if the RU has been explicitly allocated through the second trigger frame, an adequate transmission of the uplink PPDU may be impossible.

Additionally, in case the STA receives a PPDU from a neighboring BSS, i.e., inter-BSS or OBSS (overlapping BSS), instead of a BSS that is configured through an association with a specific AP, the NAV may also be configured through the corresponding PPDU. In this situation, in case the STA has its ID (i.e., its AID) included in a trigger frame of FIG. 9, and so on, and is required to transmit an uplink PPDU accordingly, problems of unclearness in how the STA is intended to configure the NAV or in whether or not the STA is required to transmit an uplink PPDU corresponding to the trigger frame existed in the related art specification (or standard).

In order to resolve the diverse problems occurring in the related art including the above-described problem, this exemplary embodiment proposes an enhanced method related to the NAV. For example, in case triggering of a specific STA is performed after a NAV has already been configured due to diverse reasons (i.e., in case a trigger frame including the AID of the corresponding STA is being received), a new method related to the NAV configuration and the uplink PPDU transmission is proposed as described below.

Figure 12:
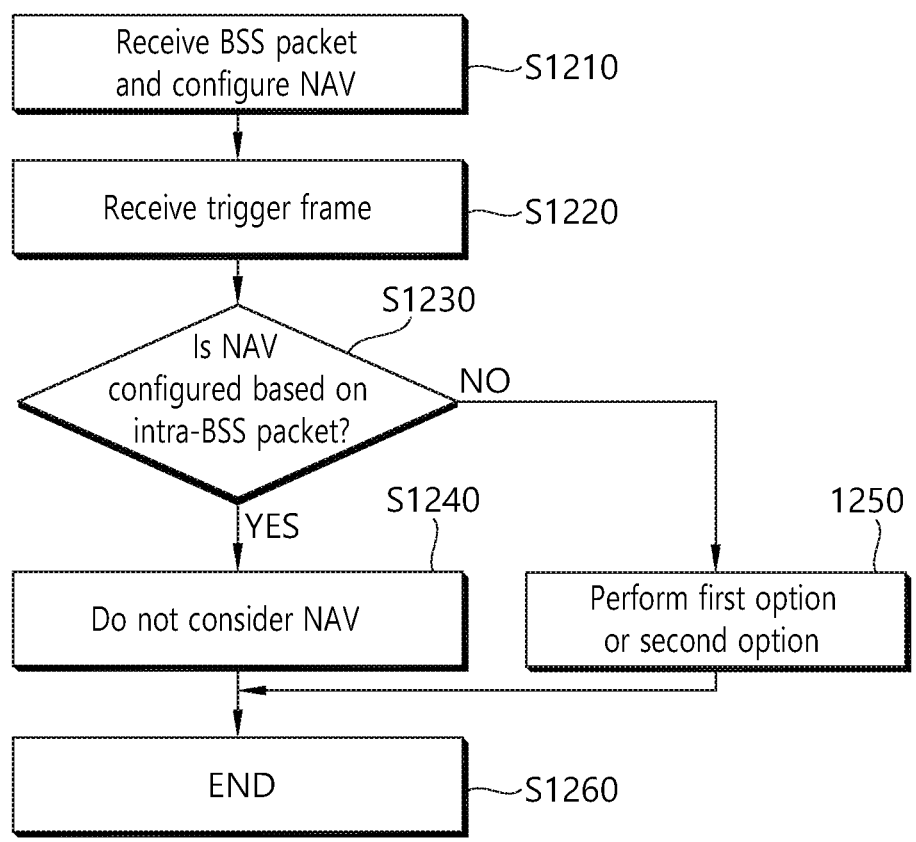
FIG. 12 is a procedure flow chart describing the operations according to the exemplary embodiment.

FIG. 12 is a procedure flow chart describing the operations according to the exemplary embodiment. The example of FIG. 12 is related to a method for configuring the NAV.

As shown in the drawing, the receiving device (e.g., non-AP STA) may receive a BSS packet (or frame) and may configure the NAV in accordance with the received BSS packet (S1210). The corresponding BSS may correspond to a packet that is received from an intra-BSS to which the receiving device belongs or may correspond to packet that is received from an OBSS or inter-BSS. Whether the packet being received through step S1210 corresponds to a packet being received from an intra-BSS or a packet being received from an OBSS may be determined by an identifier that is included in the corresponding packet. For example, in case the PPDU shown in FIG. 3 is being received, the identifier of the BSS is identified through a BSS color field, which is included in the HE-SIG A field, and, then, the corresponding packet may be identified as the intra-BSS or the OBSS by using the identifier.

In case the NAV is configured in accordance with step S1210, the corresponding receiving device cannot transmit any uplink PPDU until the NAV becomes equal to 0. However, in case the transmission of an uplink PPDU is triggered by the trigger frame, which is shown in FIG. 9, and so on, the value of the NAV may be disregarded (or ignored).

More specifically, the receiving device receives a trigger frame for uplink MU transmission (S1120). The corresponding trigger frame may be the same as in the example shown in FIG. 9, and so on.

In this case, considering the virtual carrier sensing, in case the NAV value is not equal to 0, as a rule, the receiving device cannot transmit any uplink PPDU corresponding to the trigger frame. However, this exemplary embodiment proposes an exemption for this case. More specifically, as shown in the drawing, this exemplary embodiment proposes a method of determining whether or not an uplink PPDU corresponding to the trigger frame can be transmitted without considering the NAV through step S1230.

For example, if the NAV in the receiving device is configured based on an intra-BSS packet, i.e., in case the packet that is received in step S1210 corresponds to an intra-BSS packet the above-described problem can be resolved by transmitting an uplink BSS pack without considering the corresponding NAV. Accordingly, in step S1230, it is determined whether or not the predetermined NAV is configured by an intra BSS packet.

In case the predetermined NAV is configured by an intra BSS packet (e.g., in case the packet that is received in step S1210 is received from an AP, which corresponds to the transmitting device that has transmitted the trigger frame in step S1220, and/or, in case the packet that is received in step S1210 is received from a non-AP STA belonging to an intra-BSS), the transmission of an uplink PPDU corresponding to the trigger frame is performed without considering the NAV (S1240). In case of performing step S1240, the predetermined NAV may be reset, and its previous value may be maintained. Meanwhile, in case of performing step S1240, even if the NAV is not considered, the physical carrier sensing may be additionally performed.

In step S1230, in case the predetermined NAV is not configured by an intra-BSS packet, i.e., in case the NAV is configured by an OBSS packet, the operations related to step S1250 are performed.

The operations related to step S1250 may follow any one of the two options that are described below. More specifically, in case of following the first option, the transmission of an uplink PPDU cannot be attempted before a NAV timer is expired (i.e., before the NAV value becomes equal to 0). In other words, in case of following the first option, the case of having the NAV configured by the OBSS packet cannot be excluded from the NAV operation. In case of following the first option, the NAV may not be reset or updated, and the initial NAV may not be maintained. A second option according to step S1250 corresponds to attempting to transmit an uplink PPDU while disregarding the NAV, in case a predetermined condition is satisfied (or realized). For example, in case a value marked in a length field (e.g., the length field 1010 of FIG. 10), which is indicated in the trigger frame that has been received in step S1220, is compared with a current NAV timer value, the transmission of the uplink PPDU may be allowed only in a case when the current NAV timer value is smaller. Such second option may be required for normally receiving an ACK (or Block ACK) in response to the uplink MU PPDU.

If the above-described example shown in FIG. 12 is described differently, an STA supporting an uplink MU transmission according to the trigger frame essentially supports the related art NAV operations. However, the exemplary embodiment proposes that predetermined exemptions from the NAV operations shall be accepted, and several exemptions may exist. This exemplary embodiment determines whether or not to accept the exemptions from the NAV operations based on whether or not the transmitting subject of the packet/frame/signal, which is the basis of the NAV configuration, is related to the intra-BSS. For example, in case the transmitting subject of the packet/frame/signal, which is the basis of the NAV configuration, is related to the intra-BSS, the exemptions from the NAV operations are accepted, and, accordingly, the exemplary embodiment proposes to attempt transmission of the uplink PPDU while disregarding the NAV. In addition to this, or generally, in case the transmitting subject of the packet/frame/signal, which is the basis of the NAV configuration, is related to the OBSS, either the exemptions from the NAV operations may not be accepted or, in case a specific condition is satisfied, the exemptions from the NAV operations may be accepted.

Just as in the above-described example, the method of attempting to transmit the uplink PPDU while disregarding the NAV may also be applied to another situation. More specifically, regardless of whether the packet, which is the basis of the NAV configuration, corresponds to an intra-BSS packet/frame or an OBSS packet/frame, in case a specific type of trigger frame is being received, it may be possible to attempt transmission of an uplink PPDU while disregarding the NAV. For example, in case the frame, which will hereinafter be described in detail, corresponds to a trigger frame for an OFDMA based random access or to a unicast trigger frame (i.e., the RA field of the trigger frame of FIG. 9 is determined to have a unicast address instead of a broadcast address), an uplink MU transmission may be attempted without considering the NAV. Additionally, even in a case when an MU beamforming report, a resource request, or a trigger frame related to other MAC control frames is received, an uplink MU transmission may be attempted without considering the NAV. In this case, in case the predetermined NAV is configured by an OBSS packet/frame, although a predetermined level of interference is likely to occur, since the size of the interference is limited, the above-described method may be used in order to prevent any delay in the uplink MU transmission.

Hereinafter, the basic characteristics related to the OFDMA based random access will be described in detail. The above-described trigger frame of FIG. 9 may be used for the OFDMA based random access. More specifically, a plurality of receiving devices (e.g., non-AP STAs) may be allocated with uplink resource (i.e., RU) sets for random access from the transmitting device (e.g., AP STA), and a receiving device that has succeeded (or won) in the contention may randomly select one of the corresponding resource sets. For example, the RA field 930 of the trigger frame of FIG. 9 and/or a field of the User Identifier field 1110 of FIG. 11 may be set to be equal to a predetermined value (e.g., a broadcast address may be included in the RA field, or the RA field may be set to "AID 0", or the RA field may be set to have a plurality of AIDs), and uplink resource sets for random access may be configured by using a method of designating multiple RU sets.

Figure 13:
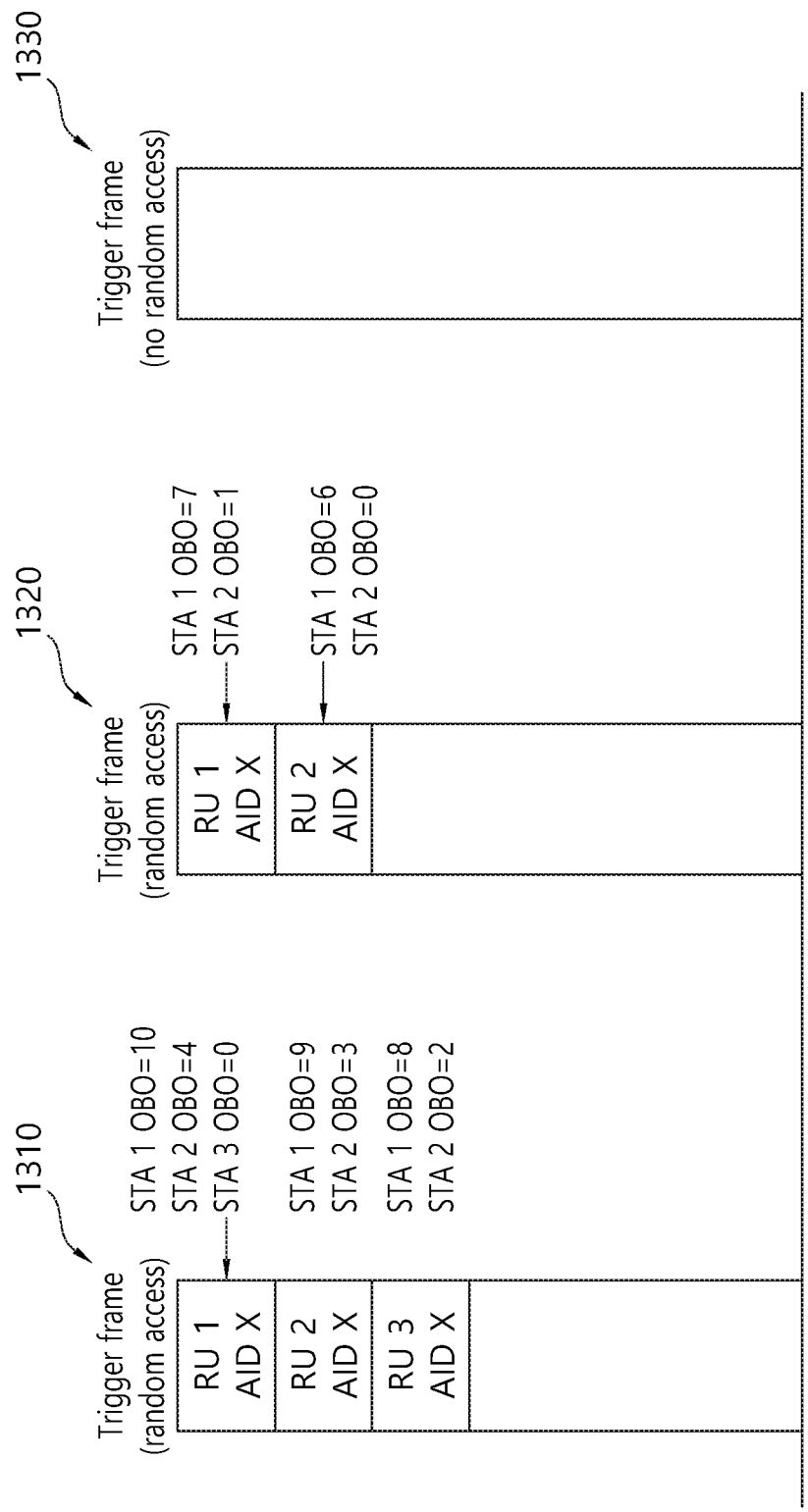
FIG. 13 is a drawing describing the basic operations of an OFDMA based random access procedure.

FIG. 13 is a drawing describing the basic operations of an OFDMA based random access procedure.

More specifically, in relation to the OFDMA based random access procedure, as shown in FIG. 13, an OFDMA Back-Off (OBO) counter is defined. The OBO counter is counted down in RU units. Additionally, an integer value that is referred to as an OFDMA contention window (OCW) value is defined, and an OCWmin value of such OCW value is determined. The OCWmin value is used for determining an OBO counter value for each STA.

The OFDMA based random access procedure may be initiated by an STA that has received the trigger frame of FIG. 9. Meanwhile, the OCWmin value is signaled to the STA performing the OFDMA based random access procedure by using diverse methods, and once the OCWmin value is delivered to the STA, the corresponding STA determines an initial value of the OBO counter by using a random value of a [0, OCWmin] duration.

In FIG. 13, if a first trigger frame 1310 is transmitted, an OBO counter value is configured for each of STAs 1-3. For example, an initial OBO counter value may be respectively set to 11, 5, 1 for STAs 1-3. Additionally, 3 RU sets for the random access may be allocated through the first trigger frame 1310. The OBO counter value may decrease by 1 per 1 RU, and, in this case, since the OBO counter value for STA3 is set to 0 for "RU 1", STA3 may randomly select one of the RU sets (i.e., RUs 1-3) that are designed through the first trigger frame 1310 and may then perform transmission. In case of STAs 1-2, since the OBO counter value is not yet set to 0, the operation of decreasing the counter value for each of the RUs is performed, and the transmission of the uplink PPDU cannot be performed.

In FIG. 13, when a second trigger frame 1320 is transmitted, the OBO counter value for each RU is decreased, and, during this process, since the OBO counter value of STA 2 becomes equal to 0, STA 2 succeeds (or wins) in the contention, thereby being capable of transmitting an uplink PPDU by using any random one of the designated RU sets (i.e., RUs 1-2-).

In FIG. 13, since a third trigger frame 1330 is not used for the random access procedure, no decrease occurs in the OBO counter, and no related random access operation is performed.

The above-described method according to the exemplary embodiment, i.e., the method of attempting to transmit an uplink PPDU without considering the NAV, may also be applied to the OFDMA based random access procedure. More specifically, an example related to the OFDMA based random access procedure proposes a method of selectively using one of the two methods or using the two methods in combination. The first proposed example relates to configuring the NAV, decreasing the above-described OBO counter even if the NAV timer is not expired (i.e., in case the NAV is greater than 0), and transmitting the uplink PPDU when the OBO counter becomes equal to 0. It is preferable that the first example is applied to a case when the NAV is configured by an intra-BSS packet/frame. More specifically, in case the packet/frame that is used for configuring the NAV is received by the transmitting device, which has transmitted the trigger frame initiating the random access procedure, and/or, in case the packet/frame that is used for configuring the NAV is received by an intra-BSS STA, it is preferable to apply the first example.

Meanwhile, it is preferable that the second example is applied to a case when the NAV is configured by an OBSS packet/frame. The second example proposes that, while the related art NAV operations are being performed (i.e., while the NAV timer is decreasing to 0), the back-off operation according to FIG. 13 is stopped (i.e., as the OBO counter decreases, if the OBO counter becomes equal to 0, the operation of transmitting an uplink PPDU to the randomly selected RU is stopped), a sleep mode is maintained until the NAV timer becomes equal to 0. The above-described two examples may be selectively used or may be used simultaneously.

Hereinafter, additional characteristics related to carrier sensing in a situation of attempting to transmit an uplink PPDU without considering the NAV will be described in detail.

More specifically, in case the transmitting device (e.g., AP) allocates an uplink MU resource, the AP may perform physical carrier sensing and/or virtual carrier sensing. In case the radio channel is determined to be in an idle state by the carrier sensing process, the trigger frame may be transmitted. However, in case the receiving device (e.g., non-AP STA) intends to initiate uplink MU transmission, it may be determined by the physical carrier sensing and/or virtual carrier sensing process performed by the receiving device that the radio channel is in a busy state. In this case, until the corresponding channel becomes idle, the receiving device is required to delay the uplink MU transmission and to perform random back-off.

In this situation, regardless of the result of the physical carrier sensing and/or virtual carrier sensing process performed by the receiving device, it may also be possible to allow the uplink MU transmission to be performed. More specifically, according to this example, even if the radio channel is determined to be in a busy state by using the CCA method, if a trigger frame transmitted via uplink MU communication is received, it may be possible to transmit the uplink MU PPDU. In this case, it may be possible that the CCA method is not performed at all by the receiving device. According to yet another example, regardless of the NAV timer, if a trigger frame for MU transmission is received, it may be possible to transmit an uplink MU PPDU. More specifically, even if the NAV is not equal to 0, it may be possible to transmit an uplink MU PPDU. The above-described two examples may be selectively used or may be used simultaneously in combination.

Figure 14:
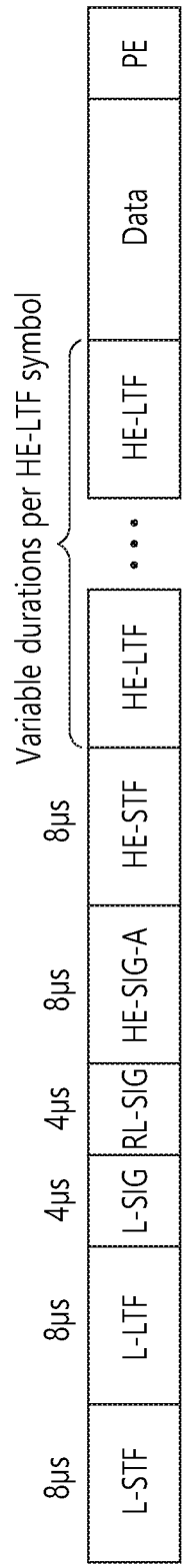
FIG. 14 is a block diagram showing an uplink MU PPDU that is transmitted in response to the above-described trigger frame.

FIG. 14 is a block diagram showing an uplink MU PPDU that is transmitted in response to the above-described trigger frame.

As shown in the drawing, the PPDU of FIG. 14 includes diverse fields, and each field corresponds to the respective fields shown in FIG. 2 to FIG. 3. Meanwhile, as shown in the drawing, the uplink PPDU of FIG. 14 does not include a HE-SIG B field and may only include a HE-SIG-A field.

Figure 15:
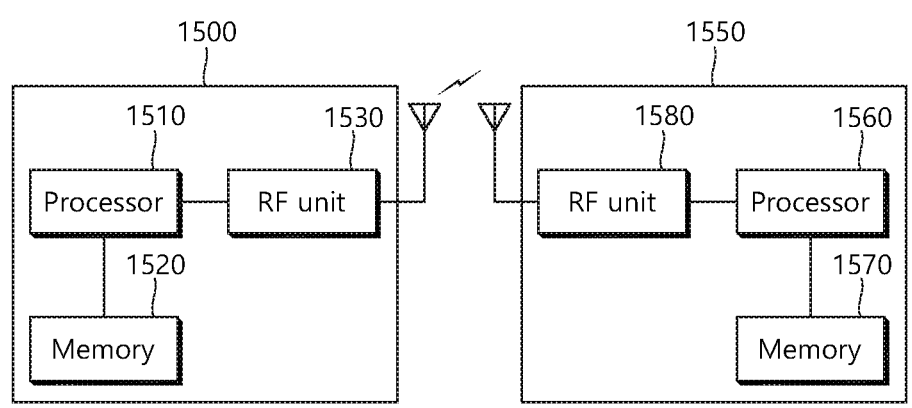
FIG. 15 is a block diagram showing a wireless device to which the exemplary embodiment may be applied.

FIG. 15 is a block diagram showing a wireless device to which the exemplary embodiment may be applied.

Referring to FIG. 15, as an STA that can realize the above-described exemplary embodiment, the wireless device may correspond to an AP or a non-AP STA (non-AP station). The wireless device may correspond to the above-described user or may correspond to a transmitting device transmitting signals to the user.

The AP 1500 includes a processor 1510, a memory 1520, and a radio frequency unit (RF) unit 1530.

The RF unit 1530 is connected to the processor 1510, thereby being capable of transmitting and/or receiving radio signals.

The processor 1510 implements the functions, processes, and/or methods proposed in the present invention. For example, the processor 1510 may be realized to perform the operations according to the above-described exemplary embodiments of the present invention. More specifically, among the operations disclosed in the exemplary embodiments of FIG. 1 to FIG. 14, the processor 1510 may perform the operations that can be performed by the AP.

The non-AP STA 1550 includes a processor 1560, a memory 1570, and a RF unit (radio frequency unit) 1580.

The RF unit 1580 is connected to the processor 1560, thereby being capable of transmitting and/or receiving radio signals.

The processor 1560 implements the functions, processes, and/or methods proposed in the present invention. For example, the processor 1560 may be realized to perform the operations of the non-AP STA according to the above-described exemplary embodiments of the present invention. The processor may perform the operations of the non-AP STA, which are disclosed in the exemplary embodiments of FIG. 1 to FIG. 14.

The processor 1510 and 1560 may include an application-specific integrated circuit (ASIC), another chip set, a logical circuit, a data processing device, and/or a converter converting a baseband signal and a radio signal to and from one another. The memory 1520 and 1570 may include a read-only memory (ROM), a random access memory (RAM), a flash memory, a memory card, a storage medium, and/or another storage device. The RF unit 1530 and 1580 may include one or more antennas transmitting and/or receiving radio signals.

When the exemplary embodiment is implemented as software, the above-described method may be implemented as a module (process, function, and so on) performing the above-described functions. The module may be stored in the memory 1520 and 1570 and may be executed by the processor 1510 and 1560. The memory 1520 and 1570 may be located inside or outside of the processor 1510 and 1560 and may be connected to the processor 1510 and 1560 through a diversity of well-known means.

What is claimed is:

1. A method of a wireless local area network, WLAN, system, comprising, at a first device:
   receiving, from a second device, a trigger frame triggering uplink multiple user transmission;
   if a network allocation vector, NAV, of the first device is configured by an intra basic service set, BSS, frame from the identified BSS, determining whether or not to transmit an uplink physical layer protocol data unit, PPDU, in response to the trigger frame regardless of the NAV configured by the intra BSS frame; and
   if the NAV of the first device is not configured by an intra (BSS) frame, determining whether or not to transmit the uplink PPDU by considering the NAV not configured by the intra BSS frame.

2. The method of claim 1, wherein the trigger frame corresponds to a medium access control, MAC, layer frame indicating an association identifier, AID, of at least one device associated with the uplink multiple user transmission.

3. The method of claim 2, wherein the trigger frame includes a length field indicating a length of the uplink PPDU.

4. The method of claim 1, wherein, in case the NAV is configured by an intra BSS frame, the first device determines whether or not to transmit the uplink PPDU by using physical carrier sensing without considering the NAV configured by the intra BSS frame.

5. A receiving device of a wireless local area network, WLAN, system, comprising:
   a radio frequency, RF, unit transmitting or receiving radio signals; and
   a processor controlling the RF unit,
   wherein the processor is configured to:
   receive a trigger frame triggering uplink multiple user transmission through the RF unit (1580);
   if a network allocation vector, NAV, of the device is configured by an intra basic service set, BSS, frame from the identified BSS, decide whether or not to transmit an uplink physical layer protocol data unit, PPDU, in response to the trigger frame regardless of the NAV configured by the intra BSS frame; and if the NAV is not configured by an intra BSS frame, determine whether or not to transmit the uplink PPDU by considering the NAV not configured by the intra BSS frame.

6. The device of claim 5, wherein the trigger frame corresponds to a medium access control, MAC, layer frame indicating an association identifier, AID, of at least one device associated with the uplink multiple user transmission.

7. The device of claim 6, wherein the trigger frame includes a length field indicating a length of the uplink PPDU.

8. The device of claim 5, wherein, in case the NAV is configured by an intra BSS frame, the processor is configured to determines whether or not to transmit the uplink PPDU by using physical carrier sensing without considering the NAV configured by the intra BSS frame.

* * * * *